United States Patent [19]
Jolliff

[11] Patent Number: 5,860,884
[45] Date of Patent: Jan. 19, 1999

[54] VARIABLE SPEED TRANSMISSION AND TRANSAXLE

[75] Inventor: Norman E. Jolliff, Salem, Ind.

[73] Assignee: Tecumseh Products Company, Tecumseh, Mich.

[21] Appl. No.: 738,842

[22] Filed: Oct. 28, 1996

[51] Int. Cl.⁶ ............................................. F16H 47/04
[52] U.S. Cl. ........................ 475/89; 475/72; 475/78; 475/94; 418/61.3
[58] Field of Search ............................ 475/72, 73, 78, 475/80, 89, 93, 94; 418/61.3

[56] References Cited

U.S. PATENT DOCUMENTS

| | | | |
|---|---|---|---|
| 1,161,066 | 11/1915 | Minor . | |
| 2,133,276 | 10/1938 | Ballantyne | 74/293 |
| 2,212,046 | 8/1940 | Ross | 74/293 |
| 2,488,408 | 11/1949 | Hollmann | 74/794 |
| 2,490,720 | 12/1949 | Thurber | 74/774 |
| 2,552,010 | 5/1951 | Marsell | 74/794 |
| 2,851,908 | 9/1958 | Nakamura | 74/791 |
| 2,921,483 | 1/1960 | Colmerauer | 74/774 |
| 3,404,761 | 10/1968 | Jaeschke | 192/61 |
| 3,749,217 | 7/1973 | Bush | 192/113 |
| 3,924,490 | 12/1975 | Mills | 74/752 E |
| 3,939,735 | 2/1976 | Lewis | 475/107 |
| 4,012,968 | 3/1977 | Kelbel | 74/711 |
| 4,181,042 | 1/1980 | Rau | 74/750 |
| 4,270,415 | 6/1981 | Dickinson | 74/867 |
| 4,334,843 | 6/1982 | Hansen | 418/61 |
| 4,439,119 | 3/1984 | Petersen | 418/61 |
| 4,468,981 | 9/1984 | Ries | 74/713 |
| 4,489,626 | 12/1984 | Lemon | 74/781 |
| 4,729,261 | 3/1988 | Tervola | 74/778 |
| 4,932,209 | 6/1990 | Okada | 60/487 |
| 4,979,583 | 12/1990 | Thoma | 180/62 |
| 5,056,994 | 10/1991 | Eisenmann et al. | 418/61.3 |
| 5,078,549 | 1/1992 | Von Kaler | 475/78 |
| 5,228,366 | 7/1993 | Thoma et al. | 475/72 X |
| 5,310,388 | 5/1994 | Qkcuoglu | 475/88 |
| 5,473,964 | 12/1995 | Okada | 74/606 R |
| 5,512,021 | 4/1996 | Shash | 475/1 |
| 5,536,215 | 7/1996 | Shaffer | 475/88 |
| 5,645,506 | 7/1997 | Mleczko | 475/104 X |

FOREIGN PATENT DOCUMENTS

| | | |
|---|---|---|
| 0 216 540 | 4/1989 | European Pat. Off. . |
| 853542 | 3/1940 | France . |
| 2 623 868 | 2/1989 | France . |
| 2 213 217 | 8/1989 | United Kingdom . |
| 2 259 338 | 3/1993 | United Kingdom . |
| WO 89/11405 | 11/1989 | WIPO . |

OTHER PUBLICATIONS

"Gear Pumps", Pumping Manual, 7th Edition, Published 1984 by Gulf Publishing Company, Houston, Texas, pp. 124, 125 and 127.

*Primary Examiner*—Dirk Wright
*Assistant Examiner*—Peter T. Kwon
*Attorney, Agent, or Firm*—Baker & Daniels

[57] ABSTRACT

A variable speed transmission or transaxle that utilizes a pump for variable braking of the output shaft or axle. A rotatable input shaft connectable to a drive source extends into a transmission housing and is operatively connected to a gear train that transmits rotational power to a transmission output shaft. A gerotor pump mounted within the housing utilizes a ring gear of an epicyclic gear of the gear train as an inner gerotor gear that meshes with an outer gerotor gear to pump fluid along a fluid conduit. By adjustably varying the resistance of the pump, the revolution rate of the epicyclic ring gear is adjusted which in turn results in a controlling of the speed of rotation of the transmission output shaft. In an alternate embodiment, a reversible transmission is provided by employing two gerotor pumps and two gear trains which allow forward and reverse speeds of rotation of the output shaft to be variably controlled.

20 Claims, 8 Drawing Sheets

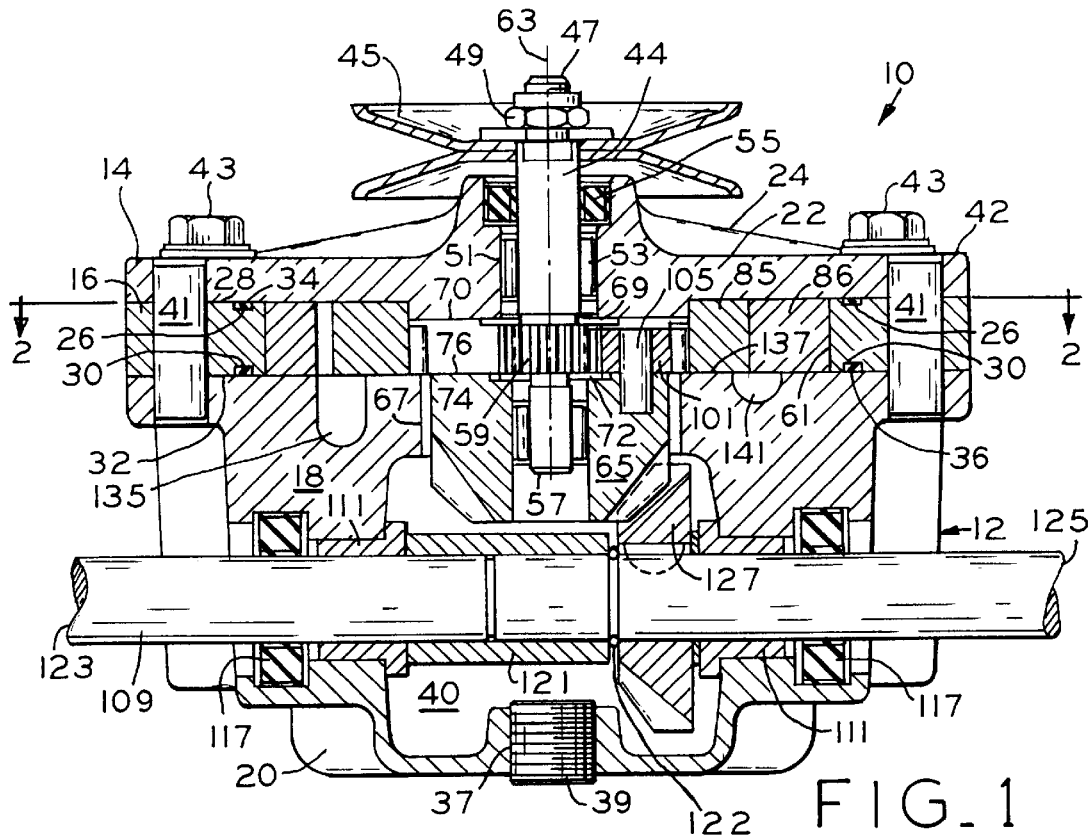
FIG_1
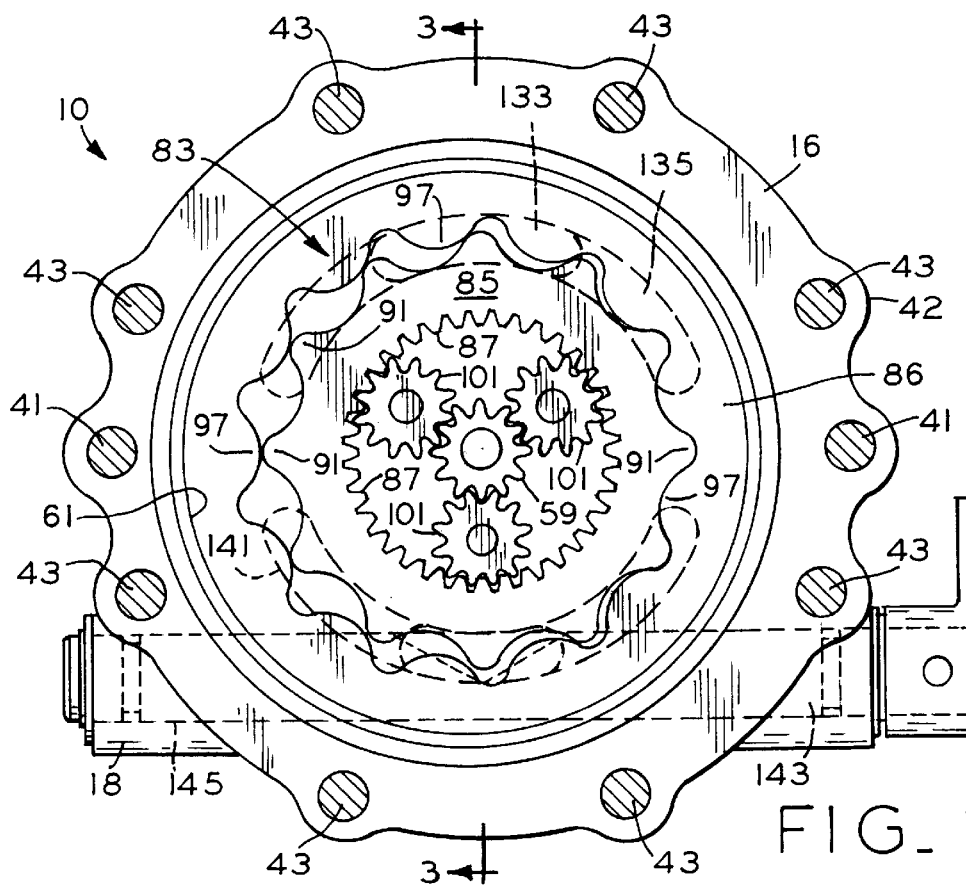
FIG_2

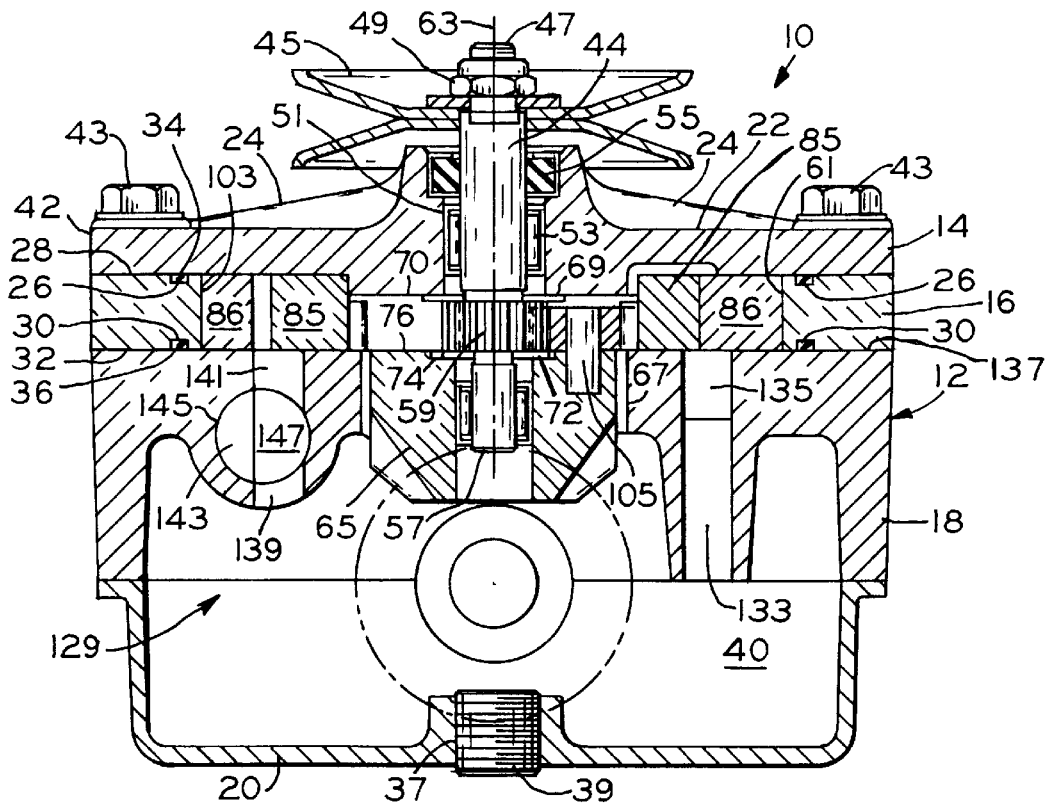
FIG_3
FIG_4

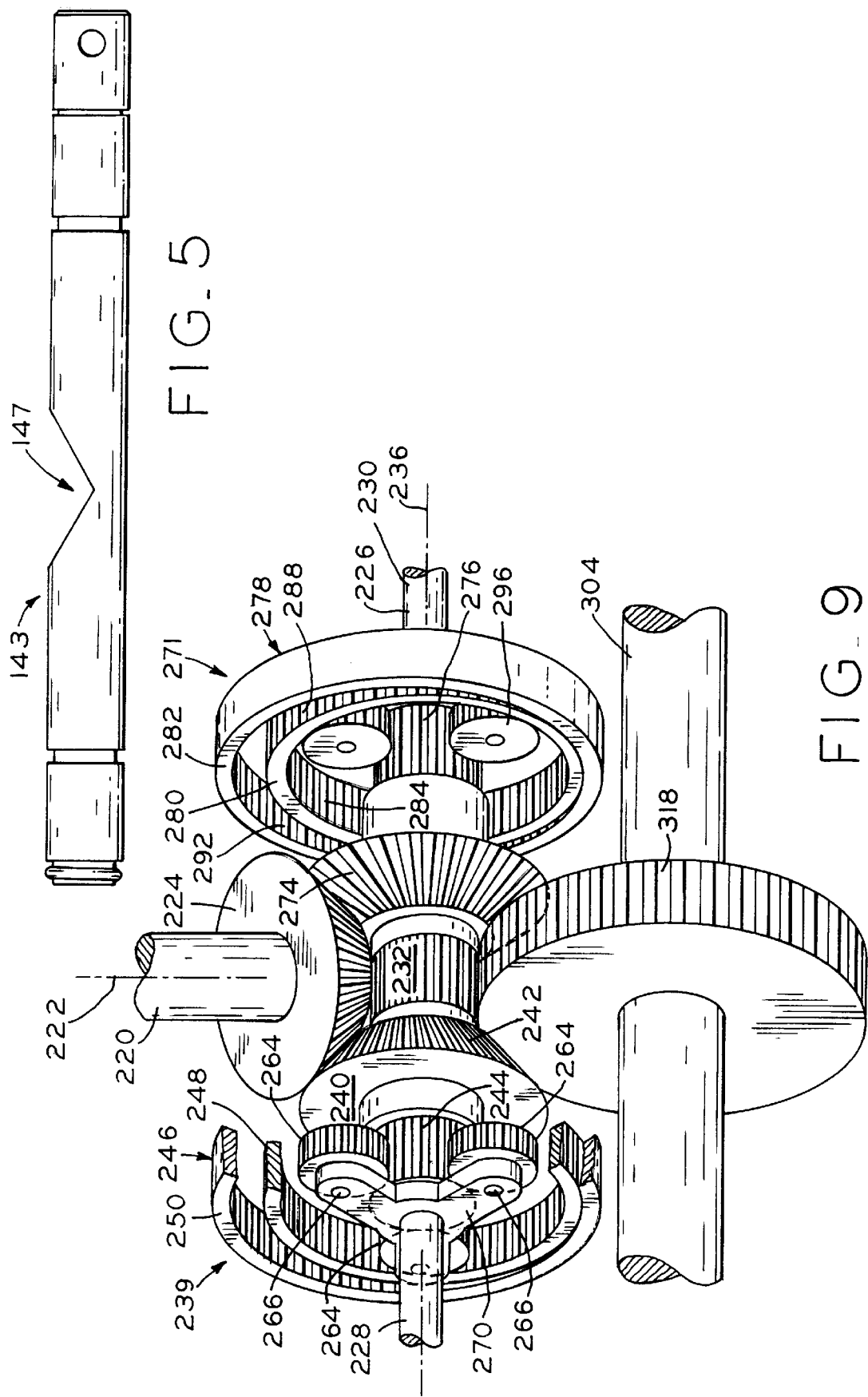

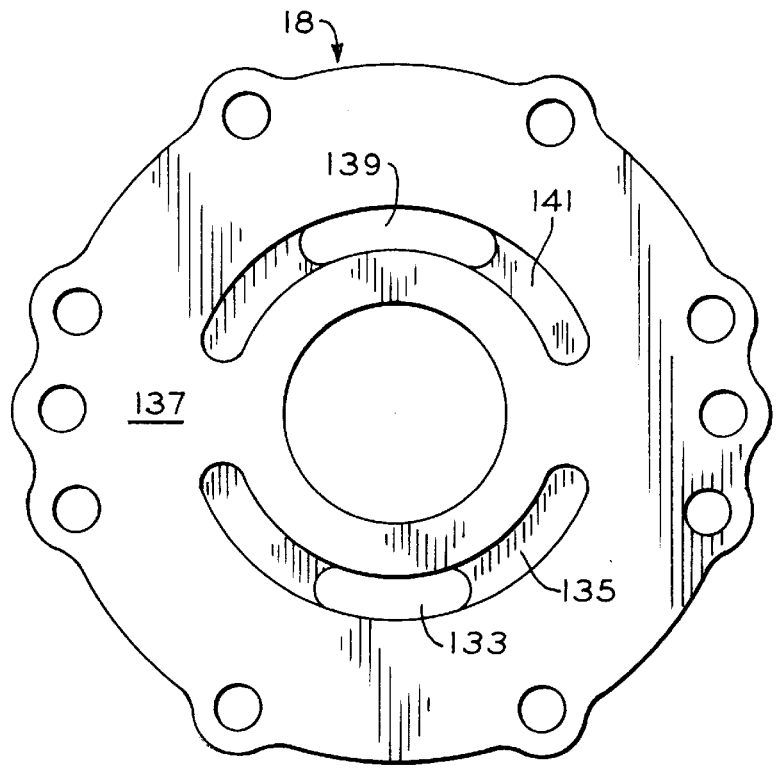
FIG_6
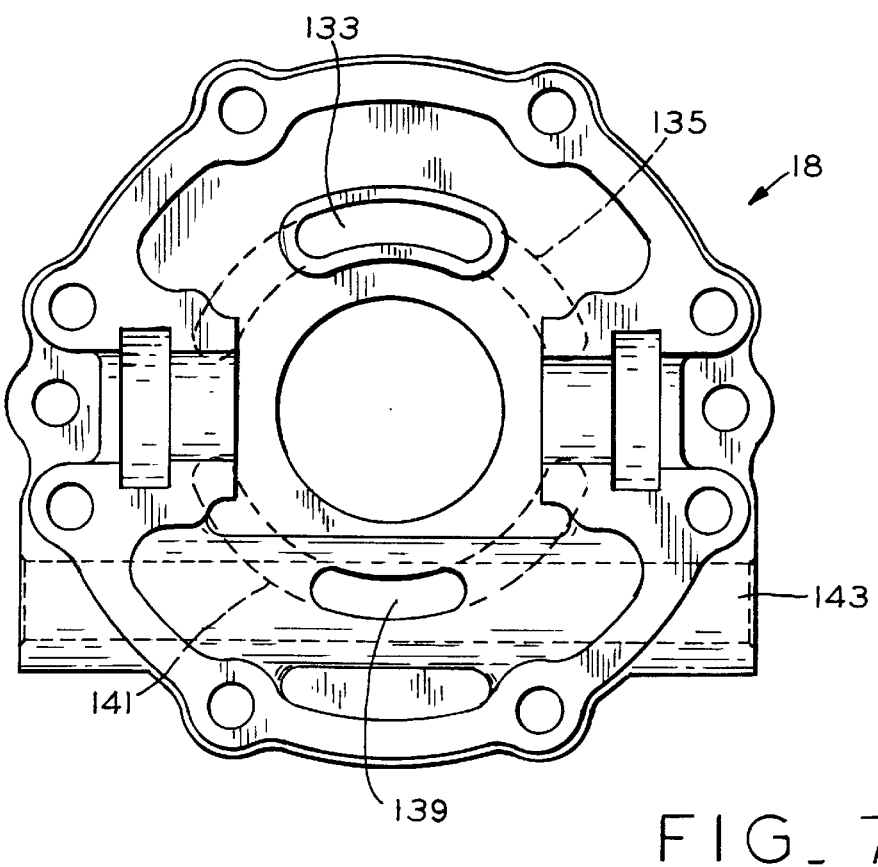
FIG_7

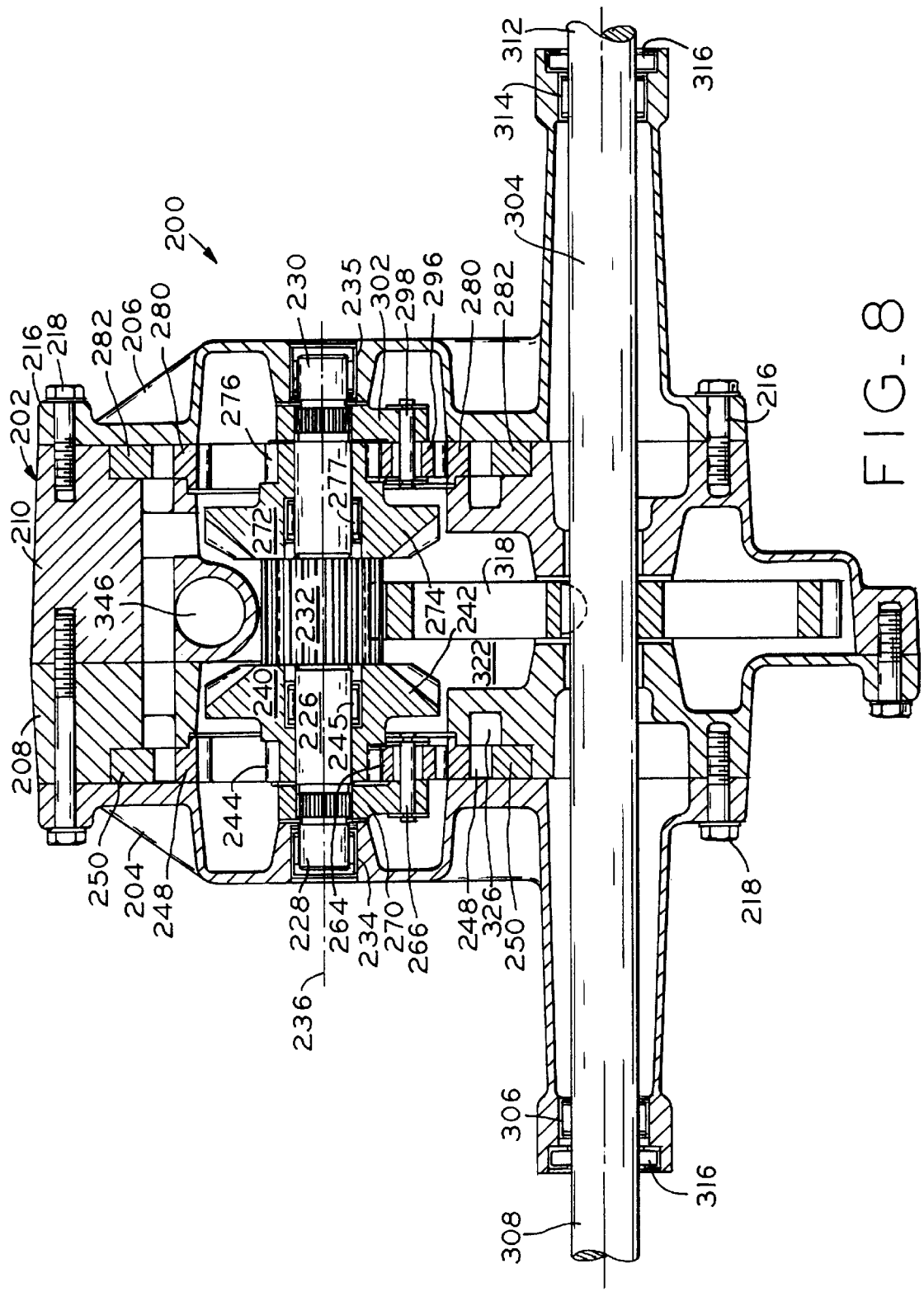
FIG._8

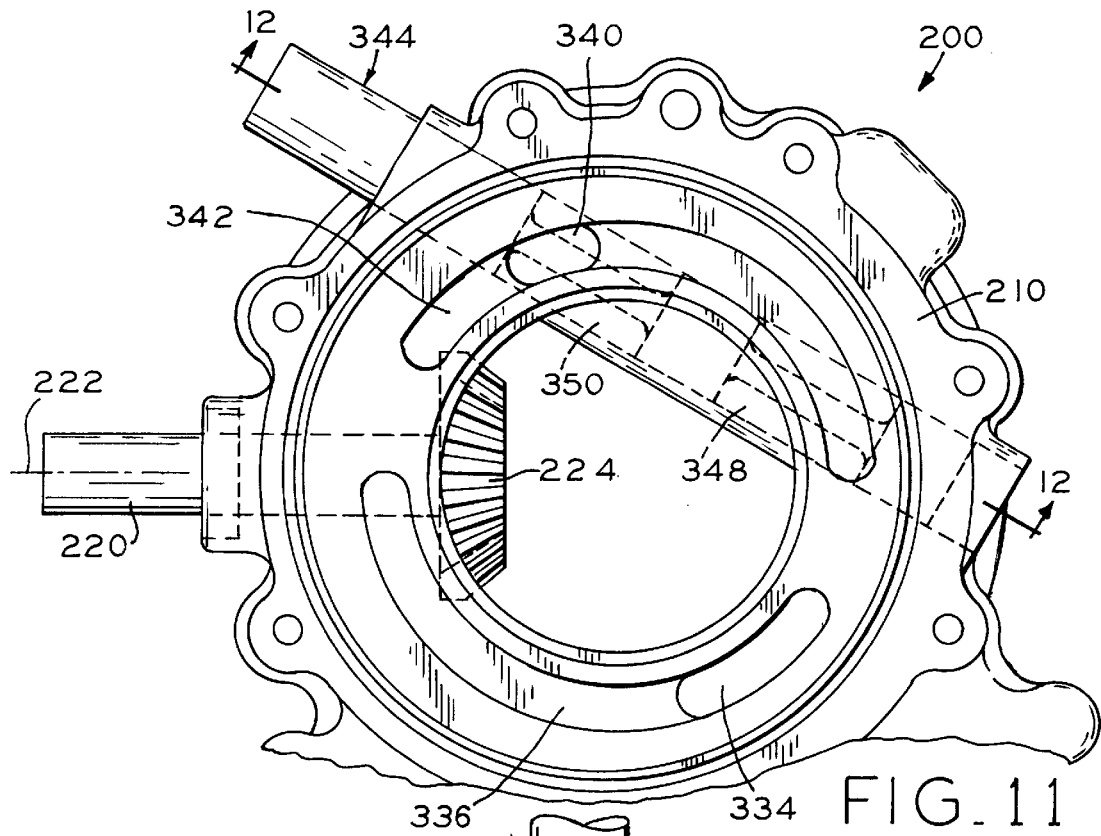
FIG_11
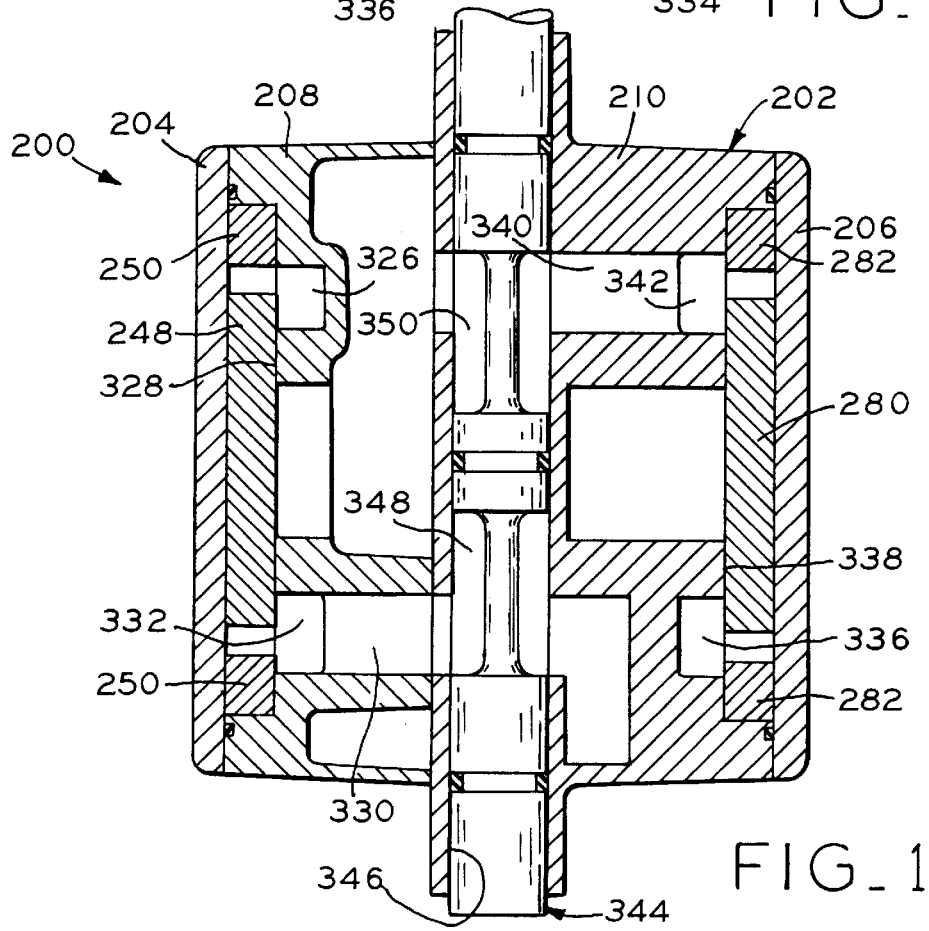
FIG_12

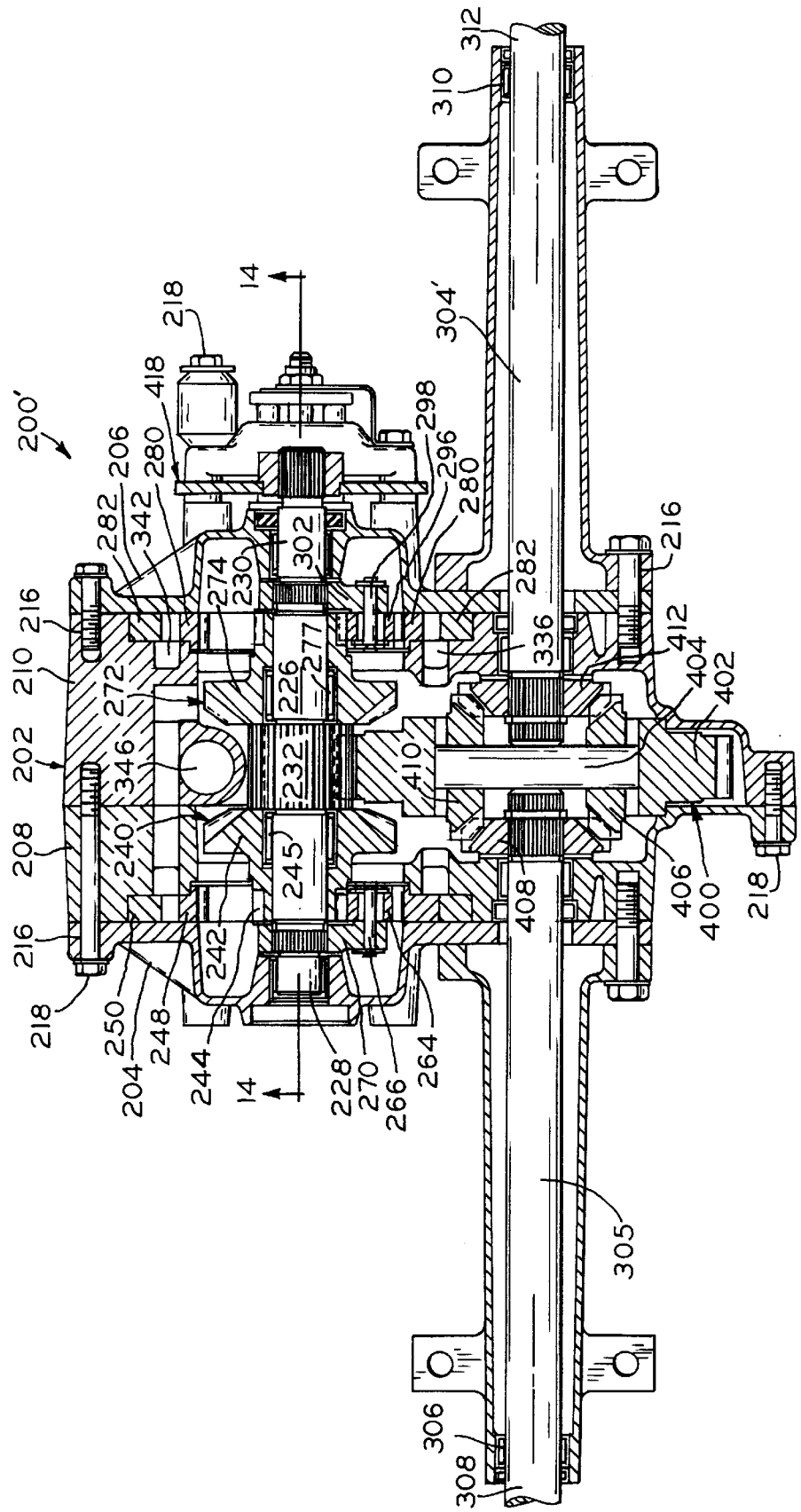
FIG_13

VARIABLE SPEED TRANSMISSION AND TRANSAXLE

FIELD OF THE INVENTION

The present invention relates to variable speed transaxles and transmissions, and, in particular, to a hydromechanical transmission coupling the input shaft to the output shaft.

BACKGROUND OF THE INVENTION

Small vehicles, such as lawn mowers, lawn and garden tractors, snow throwers, and the like, include an energy source, such as an internal combustion engine, which is used to provide power for rotatably driving an axle which is coupled to wheels which are to be rotatably driven. Most typically, the energy source operates at a single, rotary mechanical speed. Yet, for practical reasons, the axle needs to be able to be rotatably driven at a variety of forward, reverse, and/or neutral speeds. Accordingly, such vehicles may incorporate a transaxle which is used to convert the single speed, rotary mechanical motion of the energy source into a variety of output speeds.

Generally, a transaxle comprises a transaxle input shaft which is operationally coupled to the energy source, a transaxle output shaft, e.g., an axle, which is operationally coupled to the elements, e.g., wheels, which are to be rotatably driven, and transaxle componentry which operationally couples the transaxle input shaft to the transaxle output shaft. It is the transaxle componentry which converts the single speed, rotary mechanical motion received from the energy source into a variety of output speeds for rotatably driving the output shaft.

A variety of forms of transaxle componentry have been known in the art. For example, one embodiment of a transaxle which has been known in the art incorporates a clutch pedal and a gear shifting mechanism which are used to adjust the speed of the output shaft. Such transaxles require that the clutch be depressed in order to accomplish a change in direction and/or speed. In some instances, complete stopping may be required before a direction or speed change can be accomplished.

As an improvement to clutch controlled transaxles, various types of clutchless, variable speed transaxles have been developed which control output speed through a single lever. In a typical mode of operation, the lever is moved forward to move the vehicle in the forward direction or pulled backward to move the vehicle in the reverse direction. The farther forward or backward the lever is displaced, the faster the vehicle travels in the corresponding direction.

One form of variable speed transaxle now in use includes hydrostatic componentry in which a variable fluid drive transfers variable speed rotary motion to the output shaft through a mechanical gear train. Although reliable, such transmissions tend to be relatively heavy and large in size, require greater amounts of horsepower to operate which would otherwise be available for mower or other implement operation, and are relatively expensive to manufacture and install due to complex componentry.

Another form of transaxle includes friction drive componentry in which a traction wheel engages a drive disk. The traction wheel is moved radially across the center of rotation of the drive disk to vary output speed and/or direction. Such componentry, however, is unable to transfer large torque and, therefore, tends to slip within certain speed and/or load ranges. Moreover, such systems may require frequent servicing due to a lack of reliability.

Clutchless transaxles which control output speed entirely through mechanical means have also been proposed. A representative embodiment of this form of transaxle is described, for example, in U.S. Pat. No. 4,726,256 (Von Kaler). This transaxle uses dual drive power input shafts for connection to a power source. The dual input shafts are parallel, rotate in the same direction, and are coupled to a planetary gear system incorporating a sun gear, planet gears, and a ring gear. The relative rotational speeds between the two input shafts cause the planet gears to revolve clockwise, counterclockwise, or remain motionless relative to the axis of the sun gear. The speed of revolution of the planet gears is transferred to the output shaft through an output gear assembly to which the planet gears are coupled. Thus, varying the relative rotational speed of the two input shafts is used to control the revolution speed and direction of the planet gears, and hence the rotational speed and direction of the output shaft.

The transaxle of U.S. Pat. No. 4,726,256 thus provides a variable speed transaxle in which dual transaxle input shafts are coupled to the transaxle output shaft by a mechanical drive train incorporating a planetary gear system. Such a transaxle offers the potential for highly efficient power transfer from the input shafts to the output shaft. Nonetheless, the need to always drive two different input shafts may adversely affect the maximum efficiency which could be achieved by the transaxle. Further, the transaxle uses mechanical means to provide a braking action for controlling engine speed, which increases the weight and mechanical complexity of the transaxle.

Different types of pumps may be incorporated into vehicle drive systems. One known type of pump includes an externally toothed pinion gear connected to its input shaft, and the pinion gear meshes with an epicyclic gear mechanism. As the fluid path through the pump changes, the rotation speed of the pinion gear and epicyclic gear mechanism changes. However, incorporation of this separate pump into a transaxle may increase the complexity and manufacturing costs of such a transaxle, and further may frustrate attempts to provide a sufficiently compact and conveniently sized transaxle for certain applications.

Accordingly, there remains a need in the art for a reliable, simple, economic, relatively compact, clutchless, rugged, durable, variable speed transaxle which provides forward, reverse, and/or neutral speed operation.

SUMMARY OF THE INVENTION

The present invention provides a variable speed transaxle in which the transaxle input shaft is coupled to the transaxle output shaft by a hydromechanical drive train incorporating an epicyclic gear system, yet the transaxle uses hydrostatic componentry as a braking mechanism to control output speed. As a result, the present invention provides an improved, epicyclic gear-based transaxle which is simple, efficient, reliable, easy to manufacture, compact, rugged, durable, clutchless, and capable of providing variable forward, reverse, and neutral speed operation.

In one aspect, the present invention provides a variable speed transmission assembly including a rotatable input member connectable to a drive source, a rotatable output member, a gear train, a pump, and an adjustable valve. The gear train is operatively connected to the input member and the output member for transmitting rotational power of the input member to the output member, and the gear train includes an epicyclic gear. The pump pumps a fluid through a fluid conduit and uses a gear member of the epicyclic gear as a pump element that is disposed in a fluid engaging position within the fluid conduit. The adjustable valve provides for varying resistance to movement of fluid within the fluid conduit between first and second resistance levels. The epicyclic gear member revolves at a first speed to cause rotation of the output member at a first rate when the resistance to fluid movement within the fluid conduit is at the first resistance level and the input member rotates at a drive speed, and the epicyclic gear member revolves at a second speed to cause rotation of the output member at a second rate when the resistance to fluid movement within the fluid conduit is at the second resistance level and the input member rotates at the drive speed.

In another aspect, the present invention provides a variable speed transaxle including a housing for an internally disposed gear train and an internally disposed pump for pumping fluid along a fluid conduit, at least one axle shaft rotatably supported in the housing, and an input shaft extending into the housing. The gear train includes an epicyclic gear and is drivingly connected between the input shaft and the at least one axle shaft. The pump is connected to the gear train and operable to variably brake rotation of the at least one axle shaft.

In another aspect, the present invention provides a reversible transmission including a rotatable input member connectable to a drive source, an output member rotatable in forward and reverse directions, a housing, a first pump within the housing for pumping a fluid through a first fluid conduit, a second pump within the housing for pumping a fluid through a second fluid conduit, and first and second gear trains. The first gear train is operatively connected to the input member and the output member for transmitting rotational power of the input member to the output member to rotate the output member in the forward direction. The first gear train includes an epicyclic gear coupled with the first pump and structured and arranged such that operation of the first pump controls a transmittal of rotational power to the output member through the first gear train, whereby a rotation of the output member in the forward direction is controllable. The second gear train is operatively connected to the input member and the output member for transmitting rotational power of the input member to the output member to rotate the output member in the reverse direction. The second gear train includes an epicyclic gear coupled with the second pump and structured and arranged such that operation of the second pump controls a transmittal of rotational power to the output member through the second gear train, whereby a rotation of the output member in the reverse direction is controllable.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

Fig. 1 is a sectional view of a variable speed transaxle according to one embodiment of the present invention;

FIG. 2 is a plan sectional view taken along line 2—2 of FIG. 1 in the direction of the arrows;

FIG. 3 is a side sectional view taken along line 3—3 of FIG. 2 in the direction of the arrows;

FIG. 4 is a schematic, perspective view showing the functional componentry of the embodiment of FIG. 1 which is used to couple the input shaft to the output shaft;

FIG. 5 is a side view of a control rod used in the embodiment of FIG. 1;

FIG. 6 is a top view of the housing case used in the embodiment of FIG. 1;

FIG. 7 is a bottom view of the housing case of FIG. 6;

FIG. 8 is a sectional view of an alternative transaxle embodiment of the present invention;

FIG. 9 is a schematic, perspective view showing the functional componentry of the transaxle of FIG. 8 which is used to couple the input shaft to the output shaft;

Fig. 11 is a side sectional view of the embodiment of FIG. 8 showing the position of the control rod relative to the discharge passage included in the right case member;

FIG. 12 is a sectional view taken along lines 12—12 of FIG. 11 showing the orientation of the control rod in the transaxle housing;

FIG. 13 is a plan sectional view of an alternative embodiment of a transaxle according to the present invention.

Corresponding reference characters indicate corresponding parts throughout the several views. The exemplifications set out herein illustrate multiple preferred embodiments of the invention, and such exemplifications are not to be construed as limiting the scope of the invention in any manner.

DETAILED DESCRIPTION OF THE INVENTION

Figure 14:
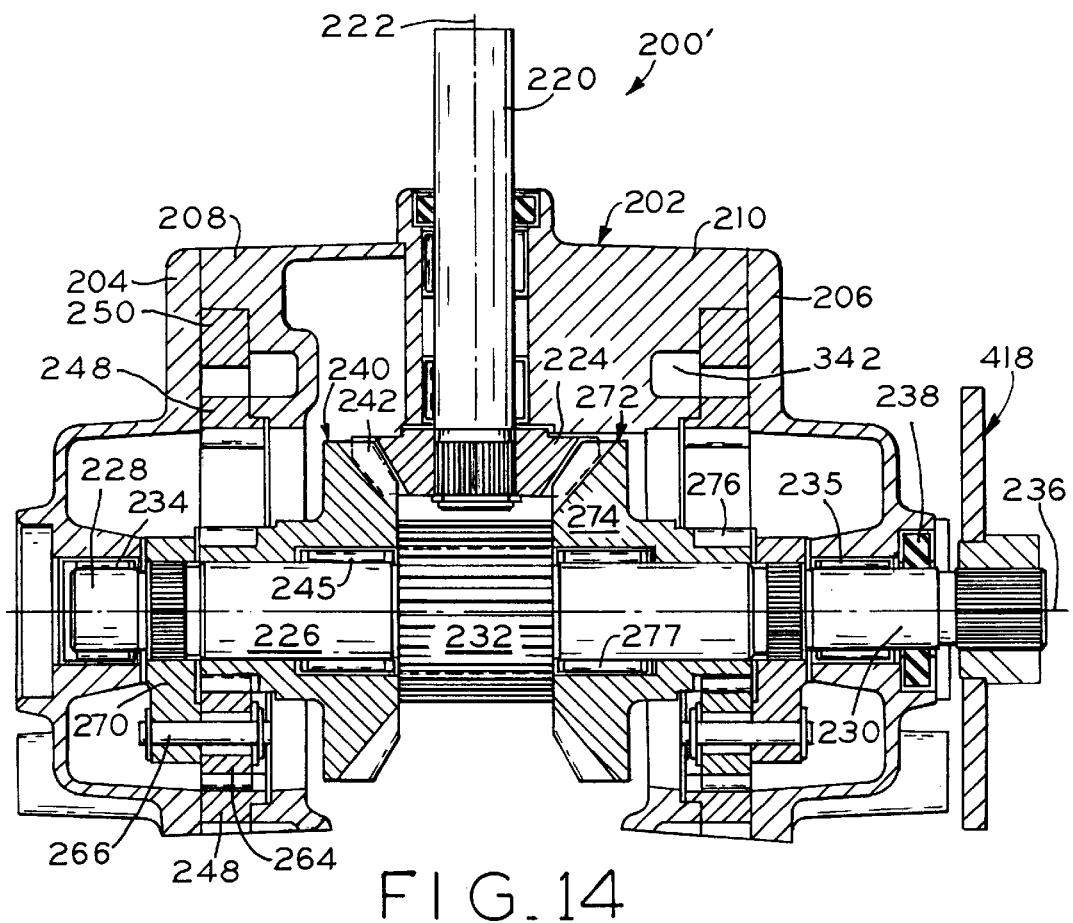
FIG. 14 is a side sectional view of the embodiment of FIG. 13 taken along lines 14—14.

The various aspects of the present invention will now be described with reference to the particular variable speed transaxle embodiments shown in FIGS. 1–14. However, the embodiments disclosed below are not intended to be exhaustive or to limit the invention to the precise forms disclosed in the following detailed description. For example, the invention finds beneficial application as a transmission wherein output shafts may be substituted for the axles shown and described herein.

Referring first to FIGS. 1–7, there is shown one embodiment of a variable speed transaxle, generally designated 10, configured in accordance with the principles of the present invention. Transaxle 10 is particularly well suited for transferring rotary motion from an energy source such as an internal combustion engine (not shown) to the drive wheels of a walk behind mower, for example, (not shown) in which transaxle 10 is installed.

Transaxle 10 includes a housing 12 comprising top cap 14, center plate 16, case 18 and bottom cap 20. Exterior face 22 of top cap 14 includes radially disposed ribs 24. Ribs 24 help strengthen top cap 14 and also provide an enlarged surface area for heat radiation in order to help cool housing 12 during transaxle operation. Center plate 16 includes annular recess 26 provided on top surface 28 proximal to the outer periphery of top surface 28. A similar annular recess 30 is provided on bottom surface 32 of center plate 16. O-rings 34 and 36 are disposed in recesses 26 and 30, respectively, in order to provide a fluid tight seal between center plate 16 and each of top cap 14 and case 18. Bottom cap 20 is provided with a threaded aperture 37 for receiving threaded plug 39. Threaded plug 39 can be easily removed and replaced when it is desired to change hydraulic fluid, e.g., oil, contained in integrally formed interior fluid cavity 40 of housing 12. A pair of dowel pins 41 used to align the transaxle componentry during assembly friction fit within bores provided within top cap 14, center plate 16 and case 18. A plurality of self-tapping fastening bolts 43 disposed around the outer periphery of housing 12 extend through top cap 14, center plate 16, case 18, and into bottom cap 20 to fasten together the transaxle housing.

Rotation input member 44 is in the form of an input shaft and is provided for receiving rotational power from the energy source (not shown) of an internal combustion engine. In the embodiment shown in FIGS. 1–7, rotational power from the energy source is transmitted to shaft 44 using a drive belt (not shown) connected to pulley 45 which is secured to the top end 47 of shaft 44. Top end 47 of shaft 44 is threaded to receive threaded fasteners, generally designated as 49, for holding pulley 45 on shaft 44. A more preferred but not shown method of retaining a pulley on shaft 44 employs retaining rings above and below the pulley hub and a woodruff key keying the shaft and the pulley hub. Shaft 44 is rotationally supported in housing 12 through an aperture 51 provided in top cap 14. The interface between shaft 44 and top cap 14 includes needle bearings 53 and oil seal 55.

Intermediate bottom end 57 and top end 47 of shaft 44, shaft 44 is provided with pinion gear 59. As shown, pinion gear 59 is integrally formed with shaft 44, but could be formed as a separate component which is fixedly mounted to shaft 44 by a key, splines, or the like, if desired. Pinion gear 59 is provided between bottom end 57 and top end 47 in a manner such that pinion gear 59 is disposed in a through aperture 61 provided in center plate 16. When rotatably driven by the drive source, shaft 44 and pinion gear 59 rotate about axis of rotation 63.

First power transmitting bevel gear 65 is rotatably mounted to bottom end 57 of shaft 44. First power transmitting bevel gear 65 is freely rotatable about shaft 44 in a manner such that rotation of shaft 44 does not directly cause rotation of bevel gear 65 and vice versa. As seen best in FIGS. 1 and 3, bevel gear 65 is mounted to the bottom end 57 of shaft 44 in a manner such that bevel gear 65 is disposed in through aperture 67 of case 18. Washer 69 is disposed on shaft 44 above pinion gear 59 and is braced against the bottom surface 70 of top cap 14. Additionally, washer 72 is disposed on shaft 44 below pinion gear 59 and is braced against recess 74 provided in the top face 76 of bevel gear 65.

With particular reference to FIG. 2, gerotor pump mechanism 83 generally comprises inner gerotor gear 85 and outer gerotor gear 86. Gerotor gears 85 and 86 are disposed in through aperture 61 of center plate 16 in a manner such that the inner gerotor gear 85 is disposed circumferentially around pinion gear 59 and the outer gerotor gear is disposed radially outward from inner gerotor gear 85. Inner gerotor gear 85 and pinion gear 59 are spaced apart radially such that the two gears are not in direct contact at any point around their respective circumferences. Inner gerotor gear 85 includes gear teeth or lobes 87 disposed on the inner periphery of gerotor gear 85 as well as gear teeth or lobes 91 disposed on the outer periphery. Outer gerotor gear 86 includes lobe-shaped gear teeth 97 disposed on the inner periphery of gerotor gear 86. Gear teeth 91 and 97 of inner gerotor gear 85 and outer gerotor gear 86 are adapted for intermeshing pumping engagement such that rotation of inner gerotor gear 85 and outer gerotor gear 86 provide a pumping action capable of pumping a flow of fluid along a fluid pathway extending to and from a fluid supply as will be described in more detail below.

In the practice of the present invention, inner gerotor gear 85 and outer gerotor gear 86 have a resistance to rotation which can be variably controlled in a continuous range extending from a first condition in which inner gerotor gear 85 and outer gerotor gear 86 are freely rotatable to a second condition in which gerotor gears 85 and 86 are locked up and unable to rotate. The resistance to rotation of inner gerotor gear 85 and outer gerotor gear 86 can be easily controlled and set to any desired value within such continuous range merely by adjusting the flow of fluid being pumped by gerotor gears 85 and 86. As will be described below with respect to a mode of operation of transaxle 10, the present invention uses the resistance to rotation of inner gerotor 85 and outer gerotor gear 86 to control the rotational speed at which transaxle 10 drives wheels drivingly coupled to transaxle 10.

Planet gears 101 of an epicyclic gear train are disposed in meshing engagement with pinion gear 59 and inner gerotor gear 85. Thus, planet gears 101 drivingly couple inner gerotor gear 85 to sun or pinion gear 59. In the embodiment shown in FIGS. 1–7, transaxle 10 includes three planet gears 101, although a greater or lesser number of such gears could still be used within the scope of the present invention. Each planet gear 101 is also rotatably mounted on a pin 105 which, in turn, is mounted in the top face of first power transmitting bevel gear 65.

Planet gears 101 are rotatably driven by pinion gear 59 according to three desirable modes of operation. In a first mode of operation, when the resistance to rotation of gerotor gears 85 and 86 is at a minimum, gerotor gears 85 and 86 can be rotatably driven by planet gears 101 at a speed corresponding to the rotational speed of pinion gear 59. In this mode of operation, planet gears 101 are essentially functioning as idler gears, transferring rotational motion from pinion gear 59 to inner gerotor gear 85. In this mode, gerotor gears 85 and 86 are driven at maximum pumping speed. Further, each planet gear 101 freely rotates about its corresponding pin 105, but none of planet gears 101 revolve around the axis of rotation 63 of shaft 44. In this mode of operation, transaxle 10 is effectively in neutral inasmuch as the rotational power of shaft 44 is not being transferred to axle 109.

In a second mode of operation, when the resistance to rotation of gerotor gears 85 and 86 is increased, planet gears 101 are only capable of rotatably driving gerotor gears 85 and 86 at a lesser rotational speed than that corresponding to the rotational speed of pinion gear 59. In this mode of operation, planet gears 101 will not only rotatably drive inner gerotor gear 85 at such lesser speed, but will also "walk" inside inner gerotor gear 85, i.e., revolve about axis of rotation 63. Because each of planet gears 101 is coupled to first power transmitting bevel gear 65 by a pin 105, the revolution of planet gears 101 about the axis of rotation 63 of shaft 44 rotatably drives the bevel gear 65 about axis of rotation 63 at a rotational speed corresponding to the revolution speed of planet gears 101. Inasmuch as bevel gear 65 is operatively coupled to the axle 109, the rotational power from shaft 44 is thereby transferred to axle 109. As the resistance to rotation of gerotor gears 85 and 86 is increased, the revolution speed of planet gears 101 about axis of rotation 63, and hence the rotational speed of axle 109, are increased. Thus, the rotational speed of axle 109 can be controlled easily by adjusting the resistance to rotation of the inner gerotor gear 85 and outer gerotor gear 86. As will be described in more detail below, such resistance to rotation is easily controlled merely by adjusting the flow of fluid being pumped by inner gerotor gear 85 and outer gerotor gear 86.

In a third mode of operation, when the resistance to rotation of gerotor gears 85 and 86 is adjusted to a sufficiently high level, planet gears 101 are unable to rotatably drive gerotor gears 85 and 86. In such a mode, planet gears 101 revolve about axis of rotation 63 at maximum speed, thus driving axle 109 at maximum speed as well.

Axle 109 is rotatably journalled within housing 12 in cylindrical sleeves 111 supported in case 18 and bottom cap 20. Oil seals 117 provide a fluid tight seal between axle 109 and the corresponding engaging portion of housing 12 at which axle 109 extends from housing 12 in order to prevent hydraulic fluid from escaping from housing 12. Spacer tube or sleeve 121 is freely mounted on axle 109 and traps a retainer ring 122 that prevents side to side movement of axle 109. First end 123 and second end 125 of axle 109 extend outward from housing 12 in mutually opposite directions. One or both ends 123 and 125 of axle 109 may be coupled to an element which is to be rotatably driven. For example, in applications in which transaxle 10 is to be used in equipment such as a lawn mowing apparatus, first end 123 and second end 125 of axle 109 may be operatively coupled to the drive wheels of the apparatus.

Second power transmitting gear 127 is in the form of a bevel gear keyed to axle 109 and operationally couples axle 109 to first power transmitting bevel gear 65. Thus, when bevel gear 65 is rotatably driven by the revolution of planet gears 101 about axis 63, rotational power of first power transmitting bevel gear 65 is transferred to axle 109 via second power transmitting gear 127. This causes axle 109 to rotate at a speed corresponding to the revolution speed of planet gears 101.

With particular reference to FIGS. 3, 6 and 7, transaxle 10 further includes a fluid pathway system along which a hydraulic fluid, such as oil, is pumped by the pumping action provided by inner gerotor gear 85 and outer gerotor gear 86. The fluid pathway system includes integral interior cavity 40 which serves as an oil sump and which is in fluid communication with fluid intake passage 133 provided in case 18. Fluid intake passage 133, in turn, is in fluid communication with arcuate recess 135 provided in the top surface 137 of case 18. Arcuate recess 135, in turn, is in fluid communication with gerotor pump 83 such that the pumping action of gerotor gears 85 and 86 draws fluid into gerotor pump 83 through fluid intake passage 133 and arcuate recess 135. Similarly, interior cavity 40 is in fluid communication with fluid discharge passage 139 also provided in case 18, and fluid discharge passage 139 is in fluid communication with arcuate recess 141 provided in top surface 137 of case 18. Arcuate recess 141, in turn, is in fluid communication with gerotor pump 83 such that the pumping action of gerotor gears 85 and 86 discharges fluid from gerotor pump 83 through arcuate recess 141 and fluid discharge passage 139.

In order to provide a valve mechanism for controlling the flow of fluid being pumped along the fluid pathway system, cylindrical control rod 143 is provided in a control rod aperture 145 extending through case 18. As seen best in FIG. 5, control rod 143 is configured with v-shaped notch 147, and the orientation of v-shaped notch 147 in control rod aperture 145 is used to control fluid flow through the pump, which in turn controls the output speed at which axle 109 is rotatably driven. For example, at one setting as is depicted in the Figures and seen best in FIGS. 2 and 3, control rod 143 may be rotated to a position such that v-shaped notch 147 is substantially aligned with fluid discharge passage 139 in a manner such that maximum fluid flow through fluid discharge passage 139 can occur. At this setting, the resistance to rotation of inner gerotor gear 85 and outer gerotor gear 86 is at a minimum because inner gerotor gear 85 and outer gerotor gear 86 have maximum freedom to pump fluid as gerotor gears 85 and 86 are caused to rotate. Under such conditions, planet gears 101 are capable of rotatably driving gerotor gears 85 and 86 at a rotational speed corresponding to the rotational speed of pinion gear 59. Thus, planet gears 101 rotatably drive gerotor gears 85 and 86 at this setting, but do not "walk" around axis of rotation 63. Thus, when control rod 143 is set so that fluid discharge passageway 139 is fully open, transaxle 10 is in a neutral mode of operation.

As control rod 143 is adjusted so that less fluid flow is allowed through fluid discharge passage 139, the resistance of inner gerotor gear 85 and outer gerotor gear 86 against rotation increases correspondingly. Now, when planet gears 101 are caused to rotate by the rotation of pinion gear 59, planet gears 101 are only capable of rotatably driving gerotor gears 85 and 86 at a lesser speed than that corresponding to the rotational speed of pinion gear 59. As a result, planet gears 101 not only cause gerotor gears 85 and 86 to rotate at such lesser speed, but planet gears 101 also will revolve around the axis of rotation 63, thus causing power transmitting bevel gear 65 to rotate about axis of rotation 63. This, in turn, causes axle 109, which is operationally coupled to power transmitting bevel gear 65 via gear 127, to rotate as well. As control rod 143 is adjusted to allow less and less fluid flow through fluid discharge passage 139, planet gears 101 revolve faster and faster about axis of rotation 63. Hence, axle 109 is driven correspondingly faster.

When control rod 143 is set such that fluid discharge passage 139 is fully closed, inner gerotor gear 85 and outer gerotor gear 86 are substantially immobilized and unable to rotate. All of the available rotational power from pinion gear 59 is now directed to causing planet gears 101 to revolve around axis of rotation 63 at a maximum revolution speed. Hence, axle 109 also rotates at its maximum speed at this setting.

Thus, by adjusting the rotational position of control rod 143 in control rod aperture 145, any desired amount of fluid flow through gerotor pump 83 can be achieved in a range from a no flow condition at which no fluid flow occurs to a maximum flow condition. Advantageously, gerotor pump 83 thereby serves as a variable brake that allows the rotational speed of axle 109 to be easily controlled and set to any desired rotational speed in a range from zero speed, i.e., neutral, to maximum speed.

It will be recognized that when intended for use as a transmission, the shown coupling of bevel gear 65 with axle 109 may be replaced with, for example, a coupling of bevel gear 65 to an output shaft. Furthermore, by connecting that output shaft to an axle through reversible gearing, forward and rearward propulsion of a vehicle in which such a transmission is installed may be achieved which would be of beneficial application in, for example, low cost self-propelled snow throwers.

Referring now to FIGS. 8–12, there is shown an alternative embodiment of a reversible, variable speed transaxle, generally designated 200, configured in accordance with the principles of the present invention. This embodiment is particularly useful for equipment such as snow throwers for which the transaxle needs to be reversible.

Transaxle 200 includes a housing 202 comprising left exterior cap 204, right exterior cap 206, left case member 208, and right case member 210. The exterior face of right exterior cap 206 desirably includes a plurality of radially disposed ribs to help strengthen right exterior cap 206 and also to provide a larger surface area for heat radiation in order to help cool housing 202 during transaxle operation.

The exterior face of left exterior cap 204 would include similar ribs. A plurality of threaded apertures 216 are disposed on housing 202 for receiving fastening bolts 218 which are used to fasten left exterior cap 204, right exterior cap 206, left case member 208, and/or right case member 210 together.

Figure 10:
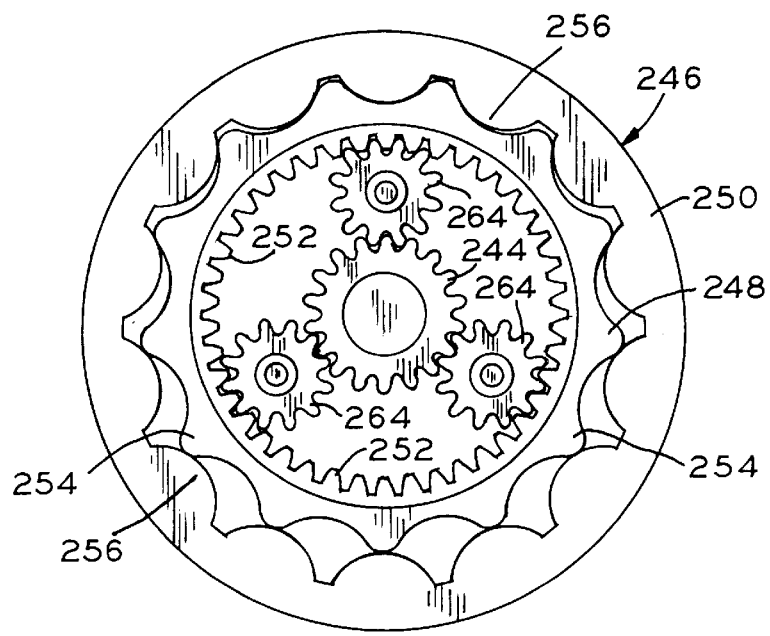
FIG. 10 is a plan view of the gerotor pump and epicyclic gear system used in the embodiment of FIG. 8.

Referring primarily now to FIGS. 8–10, rotational power from an engine (not shown) is transmitted to input shaft 220, which is rotatably journalled in housing 202. Bevel gear 224 is disposed at the bottom of input shaft 220. As shown in the drawings, bevel gear 224 is formed integrally with input shaft 220, but could be formed from a separate component which is fixedly mounted, such as by one or more keys and/or splines, to input shaft 220, if desired. When rotating, input shaft 220 and bevel gear 224 are characterized by an axis of rotation 222.

Transaxle 200 includes counter shaft 226 having a first end 228 rotatably journalled in left exterior cap 204 and a second end 230 rotatably journalled in right exterior cap 206. The interface between first end 228 and left exterior cap 204 is provided with needle bearings 234. Similarly, the interface between second end 230 and right exterior cap 206 is provided with needle bearings 235.

A first power transmitting gear 232 is disposed on a central portion of counter shaft 226. When rotating, counter shaft 226 and first power transmitting gear 234 share a common axis of rotation 236. As shown in FIG. 9, first power transmitting gear 232 is integrally formed with counter shaft 226 but could be formed from a separate component which is fixedly mounted, such as by one or more keys or splines or the like, to counter shaft 226, if desired. Input shafts 220 and counter shaft 226 are shown in a preferred orientation in which axis of rotation 222 of input shaft 220 is substantially perpendicular to axis of rotation 236 of counter shaft 226.

Transaxle 200 includes a first drive train system, generally designated as 239, disposed on one side of counter shaft 226 to the left of first power transmitting gear 232 and a second drive train system, generally designated as 271, disposed on the other side of counter shaft 226 to the right of first power transmitting gear 232. The two drive trains are essentially identical except that one drives output shaft or axle 304 in a forward direction, and the other drives axle 304 in a reverse direction. Either drive train system can be selected to correspond to the forward or reverse direction as desired, and such selection will depend mainly upon the manner in which transaxle 200 is installed in an apparatus having components, such as wheels, to be rotatably driven by transaxle 200.

Referring now to the first drive train system 239 as shown best in FIGS. 8–10, first rotation input member 240 is rotatably mounted for free-wheeling rotation on counter shaft 226. Thus, first rotation input member 240 is freely rotatable about counter shaft 226 in a manner such that rotation of first rotation input member 240 does not directly cause rotation of counter shaft 226 and vice versa. First rotation input member 240 receives rotational power from bevel gear 224 of input shaft 220. First rotation input member 240 includes beveled gear portion 242 and pinion gear portion 244. First rotation input member 240 is disposed on counter shaft 226 between first end 228 and first power transmitting gear 232 in a manner such that bevel gear 242 operationally engages and is rotatably driven by bevel gear 224 of input shaft 220. First rotation input member 240 shares axis of rotation 236 with counter shaft 226 and first power transmitting gear 232. The interface between first rotation input member 240 and counter shaft 226 is provided with needle bearings 245.

A first gerotor pump mechanism, generally designated as 246, comprises inner gerotor gear 248 and outer gerotor gear 250. Gerotor gears 248 and 250 are disposed in an aperture of left case member 208 in a manner such that the inner gerotor gear 248 is disposed circumferentially around pinion gear portion 244 and the outer gerotor gear 250 is disposed radially outward from inner gerotor gear 248. As seen best in FIGS. 9 and 10, inner gerotor gear 248 and pinion gear portion 244 are spaced apart radially such that the two gears are not in direct contact.

Inner gerotor gear 248 includes gear teeth 252 disposed on the inner periphery of gear 248 as well as lobe-shaped gear teeth 254 disposed on outer periphery of gear 248. Outer gerotor gear 250 includes lobe-shaped gear teeth 256 disposed on the inner periphery of gear 250. Gear teeth 254 and 256 of inner gerotor gear 248 and outer gerotor gear 250 are adapted for intermeshing pumping engagement such that rotation of inner gerotor gear 248 and outer gerotor gear 250 provides a pumping action capable of pumping a flow of fluid along a fluid pathway extending to and from a fluid supply in an analogous fashion to the manner in which gerotor gears 85 and 86 described with reference to transaxle 10 shown in FIGS. 1–7 accomplish a pumping action. Thus, inner gerotor gear 248 and outer gerotor gear 250 have a resistance to rotation which can be variably controlled in a continuous range extending from a first condition in which inner gerotor gear 248 and outer gerotor gear 250 are freely rotatable to a second condition in which gerotor gears 248 and 250 are locked up and unable to rotate. The resistance to rotation of inner gerotor gear 248 and outer gerotor gear 250 can be easily controlled and set to any desired value within such continuous range merely by adjusting the flow of fluid being pumped by gerotor gears 248 and 250. As was described above with respect to a mode of operation of transaxle 10 of FIGS. 1–7, transaxle 200 of FIGS. 8–12 uses the resistance to rotation of inner gerotor 248 and outer gerotor gear 250 as a variable brake to control the rotational speed at which transaxle 200 drives wheels drivingly coupled to transaxle 200.

Referring again primarily to FIGS. 8–10, planet gears 264 are disposed in meshing engagement with pinion gear portion 244 and inner gerotor gear 248. Thus, planet gears 264 drivingly couple pinion gear portion 244 and inner gerotor gear 248. Each planet gear 264 is rotatably mounted on a corresponding pin 266 which is received in base plate 270. Base plate 270 is fixedly coupled to counter shaft 226 in a manner such that rotation of base plate 270 about axis of rotation 236 also rotatably drives counter shaft 226 about axis of rotation 236. Rotation of counter shaft 226, in turn, rotatably drives first power transmitting gear 232 at a corresponding speed in a corresponding direction of rotation.

Planet gears 264 have three desirable modes of operation which are analogous to the modes of operation associated with planet gears 101 described with respect to transaxle 10 of FIGS. 1–7. For example, when the resistance against rotation of gerotor gears 248 and 250 is at a minimum, planet gears 264 are capable of rotatably driving inner gerotor gear 248 at a speed corresponding to the rotational speed of pinion gear portion 244. In this mode of operation, planet gears 264 are essentially functioning as idler gears, transferring rotational motion from pinion gear portion 244 to inner gerotor gear 248. At this setting, gerotor gears 248 and 250 are driven at maximum pumping speed. Further, each planet gear 264 freely rotates about its corresponding pin 266, but none of planet gears 264 revolve around the axis of rotation 236 of rotation input member 240. In this mode of operation, first drive train system 239 is effectively in neutral inasmuch as the rotational power of rotation input member 240 is not being transferred to axle 304.

In a second mode of operation, the resistance to rotation of gerotor gears 248 and 250 is increased such that planet gears 264 are only capable of rotatably driving gerotor gears 248 and 250 at a lesser rotational speed than that corresponding to the rotational speed of pinion gear portion 244. In this mode of operation, planet gears 264 will not only rotatably drive inner gerotor gear 248 at such lesser speed, but will also "walk" inside inner gerotor gear 248, i.e., revolve about axis of rotation 236. Because planet gears 264 are coupled to first power transmitting gear 232 by pins 266, base plate 270, and counter shaft 226, the revolution of planet gears 264 about the axis of rotation 236 rotatably drives the first power transmitting gear 232 about axis of rotation 236 at a rotational speed corresponding to the revolution speed of planet gears 264. Inasmuch as first power transmitting gear 232 is operatively coupled to the axle 304, a portion of the rotational power from rotation input member 240 is thus transferred to axle 304. As the resistance to rotation of gerotor gears 248 and 250 is increased, the revolution speed of planet gears 264 about axis 236, and hence the rotational speed of axle 304, are increased. Thus, the rotational speed of axle 304 can be controlled easily by adjusting the resistance to rotation of the inner gerotor gear 248 and outer gerotor gear 250. As will be described in more detail below, such resistance to rotation is easily controlled merely by adjusting the flow of fluid being pumped by inner gerotor gear 248 and outer gerotor gear 250.

In a third mode of operation, the resistance to rotation of gerotor gears 248 and 250 may be adjusted to a sufficiently high level such that planet gears 264 are unable to rotatably drive gerotor gears 248 and 250. At this setting, planet gears 264 revolve about axis of rotation 236 at maximum speed, thus driving axle 304 at maximum speed as well.

Second drive train system 271 is essentially identical in form and function to first drive train system 239, except that second drive train system 271 may be used to rotatably drive axle 304 in the opposite direction from the direction in which axle 304 may be rotatably driven by first drive train system 239. Second drive train system 271 includes second rotation input member 272 which is rotatably mounted for free-wheeling rotation on counter shaft 226 for receiving rotational power from bevel gear 224 of input shaft 220. Thus, second rotation input member 272 is freely rotatable about counter shaft 226 in a manner such that rotation of first rotation input member 272 does not directly cause rotation of counter shaft 226 and vice versa. Second rotation input member 272 includes bevel gear portion 274 and pinion gear portion 276.

Second rotation input member 272 is disposed on counter shaft 226 between second end 230 and first power transmitting gear 232 in a manner such that bevel gear portion 274 operationally engages and is rotatably driven by bevel gear 224 of input shaft 220. Because second rotation input member 272 is on the opposite side of bevel gear 224 relative to first rotation input member 240, bevel gear 224 rotatably drives rotation input members 240 and 272 in opposite directions. As a result, first drive train system 239 is capable of driving axle 304 in one direction, e.g., forward, and second drive train system 271 is capable of driving axle 304 in the opposite direction, e.g., reverse. Second rotation input member 272 shares axis of rotation 236 with counter shaft 226 and first power transmitting gear 232. The interface between second rotation input member 272 and counter shaft 226 is provided with needle bearings 277.

A second gerotor pump mechanism, generally designated as 278, comprises inner gerotor gear 280 and outer gerotor gear 282. Gerotor gears 280 and 282 are disposed in an aperture of right case member 210 in a manner such that the inner gerotor gear 280 is disposed circumferentially around pinion gear portion 276 and the outer gerotor gear 282 is disposed radially outward from inner gerotor gear 280. As seen best in FIG. 9, inner gerotor gear 280 and pinion gear portion 276 are spaced apart radially and therefore do not directly contact each other.

Inner gerotor gear 280 includes gear teeth 284 disposed on the inner periphery of gear 280 as well as lobe-shaped gear teeth 288 disposed on the outer periphery of gear 280. Outer gerotor gear 282 includes lobe-shaped gear teeth 292 disposed on the inner periphery of gear 282. Gear teeth 288 and 292 of inner gerotor gear 280 and outer gerotor gear 282 are adapted for intermeshing pumping engagement such that rotation of inner gerotor gear 280 and outer gerotor gear 282 provides a pumping action capable of pumping a flow of fluid along a fluid pathway extending to and from a fluid supply in an analogous fashion to the manner in which gerotor gears 85 and 86 described with reference to transaxle 10 shown in FIGS. 1–7 accomplish a pumping action.

Referring now to FIGS. 8 and 9, planet gears 296 are disposed in meshing engagement with pinion gear portion 276 and inner gerotor gear 280. Thus, planet gears 296 drivingly couple pinion gear portion 276 and inner gerotor gear 280. Each planet gear 296 is rotatably mounted on a pin 298 which is received in base plate 302. Base plate 302 is fixedly coupled to counter shaft 226 in a manner such that rotation of base plate 302 about axis of rotation 236 also rotatably drives counter shaft 226 about axis of rotation 236. Rotation of counter shaft 226, in turn, rotatably drives first power transmitting gear 232 at a corresponding speed in a corresponding direction of rotation. Planet gears 296 have three desirable modes of operation which are analogous to the modes of operation associated with planet gears 264.

As shown best in FIGS. 8 and 9, axle 304 includes a first end 308 rotatably journalled in housing 202 upon needle bearings 306 and a second end 312 rotatably journalled upon needle bearings 314. Oil seals 316 provide a fluid tight seal between axle 304 and the corresponding portions of housing 202 at which axle 304 extends from housing 202. First power transmitting gear 232 is operationally coupled to axle 304 through second power transmitting gear 318, which is keyed to axle 304 and meshingly engages first power transmitting gear 232. Thus, when first power transmitting gear 232 is rotatably driven by revolution of counter shaft 226, the rotational power of first power transmitting gear 232 is transferred to axle 304 via the second power transmitting gear 318. This, in turn, causes axle 304 to rotate at a corresponding speed and in a corresponding direction.

The rotation of input shaft 220 rotatably drives rotation input members 240 and 272 in opposite rotational directions. Because in the practice of the present invention either first rotation input member 240 or second rotation input member 272 can be used to alternatively cause counter shaft 226 to rotate in reverse or forward directions, as desired, axle 304 can be rotatably driven in a forward or reverse direction as desired. For purposes of illustration, it will be assumed that input shaft 220 rotatably drives first rotation input members 240 in a forward direction and second rotation input member 272 in a reverse direction. However, in actual practice, the correspondence between rotation input member 240 and 272 and the forward and reverse directions will depend upon the direction in which input shaft 220 is driven by the engine source, the orientation of transaxle 200 in the equipment in which it is installed, and the like.

Referring primarily now to FIGS. 8, 11 and 12, transaxle 200 includes a fluid pathway system along which a hydraulic fluid, such as oil, is pumped by the pumping action provided by first gerotor pump mechanism 246 and/or second gerotor pump mechanism 278. The pathway system includes interior cavity 322 which is in fluid communication with each of the gerotor pump mechanisms 246 and 278. With respect to first gerotor pump mechanism 246, the fluid pathway system includes a fluid intake passage (not shown) provided in left case member 208, arcuate intake recess 326 provided in the outboard surface 328 of left case member 208, fluid discharge passage 330 provided in left case member 208, and arcuate discharge recess 332 provided in the outboard surface 328 of left case member 208. During pumping action of first gerotor pump mechanism 246, fluid is drawn from interior cavity 322 into first gerotor pump mechanism through the not shown intake passage 324 and arcuate intake recess 326, and fluid is discharged from first gerotor pump mechanism 246 into interior cavity 322 through arcuate discharge recess 332 and fluid discharge passage 330.

Similarly, with respect to second gerotor pump mechanism 278, the fluid pathway system further includes fluid intake passage 334 provided in right case member 210, arcuate intake recess 336 provided in the outboard surface 338 of right case member 210, fluid discharge passage 340 provided in right case member 210, and arcuate discharge recess 342 provided in the outboard surface 338 of right case member 210. During pumping action of second gerotor pump mechanism 278, fluid is drawn from interior cavity 322 into second gerotor pump mechanism through intake passage 334 and arcuate intake recess 336, and fluid is discharged from second gerotor pump mechanism 278 into interior cavity 322 through arcuate discharge recess 342 and fluid discharge passage 340.

As shown best in FIGS. 11 and 12, a cylindrical control rod 344 is provided in control rod aperture 346 in order to provide a valve mechanism for easily controlling the flow of fluid being pumped by each of gerotor pump mechanisms 246 and 278. Control rod 344 includes a first circumferential recess portion 348 which is used to control the flow of fluid discharged through fluid discharge passageway 330 by gerotor pump mechanism 246. Control rod 344 further includes a second circumferential recess portion 350 which is used to control the flow of fluid discharged through fluid discharge passageway 340 by gerotor pump mechanism 278. Control rod 344 is moved axially upward and downward in control rod aperture 346 in order to regulate fluid flow. Generally, from a neutral position in which recesses 348 and 350 are both aligned with fluid discharge passageways 330 and 340, respectively, such that both fluid discharge passageways are fully open, control rod 344 is moved axially in either direction to gradually close off fluid flow for one discharge passageway while the other passageway remains fully open. This allows the axial position of control rod 344 to be used to control both the forward and reverse rotational speeds of axle 304.

For example, FIG. 12 shows control rod 344 in a neutral position in which fluid flow through the forward and reverse discharge passageways 330 and 340 is at a maximum. As a result, the gerotor gears of both gerotor pump mechanisms 246 and 278 are characterized by a minimum resistance against rotation such that each has a maximum ability to pump fluid from interior cavity 322, through the corresponding gerotor gears, and then back to the interior cavity 322 through the recesses 348 and 350 provided in control rod 344. At this setting, the planet gears 264 and 296 of each drive train system 239 and 271, respectively, rotatably drive the gerotor gears of the corresponding gerotor pump mechanism, but planet gears 264 and 296 do not revolve around axis of rotation 236. Thus, no rotational power from input shaft 220 is transmitted to axle 304.

However, as control rod 344 as shown in the neutral position of FIG. 12 is moved axially upward, fluid flow through the forward discharge passageway 330 is gradually restricted, whereas the fluid flow through the reverse discharge passageway 340 remains fully open. As a result, the reverse drive train 271 remains in neutral, whereas the forward drive train 239 begins to rotatably drive axle 304 in the forward rotational direction. As more of the fluid flow through the forward discharge passageway 330 is restricted, axle 304 is rotatably driven faster and faster. When fluid flow through forward discharge passageway 330 is fully closed off, axle 304 is rotatably driven at the maximum forward speed.

In a similar fashion, as control rod 344 as shown in the neutral position of FIG. 12 is moved axially downward, fluid flow through the reverse discharge passageway 340 is gradually restricted, whereas the fluid flow through the forward discharge passageway 330 remains fully open. As a result, the forward drive train 239 remains in neutral, whereas the reverse drive train 271 begins to rotatably drive axle 304 in the reverse rotational direction. As more of the fluid flow through the reverse discharge passageway 340 is restricted, axle 304 is rotatably driven faster and faster. When fluid flow through reverse discharge passageway 340 is fully closed off, axle 304 is rotatably driven at the maximum reverse speed.

Another embodiment of a transaxle configured in accordance with the present invention is shown in FIGS. 13–14 and is generally designated 200'. With two exceptions, transaxle 200' of FIGS. 13–14 is identical in all respects to transaxle 200 of FIGS. 8–12, and therefore similar parts are similarly referenced. One difference is that transaxle 200' of FIGS. 13–14 includes differential 400 in place of second power transmitting gear 318. Differential 400 includes ring gear 402 meshed with first power transmitting gear 232, a transverse shaft 404, and bevel gears 406, 408, 410, and 412, which are drivingly connected to axle 304. As a second difference, transaxle 200' of FIGS. 13–14 includes disc brake assembly 418 disposed at the second end 230 of counter shaft 226. Disc brake assembly 418 is of a conventional type, being similar to the brake assembly described in U.S. Pat. No. 3,812,735.

While this invention has been described as having preferred designs, the present invention can be further modified within the spirit and scope of this disclosure. Transmissions and transaxles of the present invention may be equipped with gear trains that use all types of epicyclic gears, including star gears, planetary gears and solar gears. Furthermore, while the pump serving as the variable brake in each of the illustrated transaxles is a gerotor pump, other types of pumps may be employed. For example, a gear pump may be utilized, and the epicyclic ring gear may serve as an internal gear of such a pump. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A variable speed transmission assembly comprising:
    a rotatable input member connectable to a drive source;
    a rotatable output member;
    a gear train operatively connected to said input member and said output member for transmitting rotational power of said input member to said output member, said gear train comprising an epicyclic gear mechanism including a first gear member;
    a pump for pumping a fluid through a fluid conduit, said pump including a first element and a second element, said first and second pump elements each disposed in a fluid engaging position within said fluid conduit, wherein said first pump element comprises said first gear member and said first pump element is disposed within said second element;
    an adjustable valve for varying a resistance to movement of fluid within said fluid conduit between a first resistance level and a second resistance level; and
    wherein said first gear member revolves at a first speed to cause rotation of said output member at a first rate when said resistance to fluid movement within said fluid conduit is at said first resistance level and said input member rotates at a drive speed, and wherein said first gear member revolves at a second speed to cause rotation of said output member at a second rate when said resistance to fluid movement within said fluid conduit is at said second resistance level and said input member rotates at said drive speed.

2. The variable speed transmission assembly of claim 1 wherein said first gear member comprises a ring gear.

3. The variable speed transmission assembly of claim 2 wherein said pump comprises a gerotor pump, wherein said second pump element comprises an outer gerotor gear, and wherein said ring gear comprises an inner gerotor gear in intermeshing pumping engagement with said outer gerotor gear such that relative rotation between said inner and outer gerotor gears provides a pumping action capable of pumping a flow of fluid through said fluid conduit.

4. The variable speed transmission assembly of claim 2 wherein said pump comprises a gear pump, wherein said second pump element and said ring gear comprise first and second inner gears of said gear pump in intermeshing pumping engagement gear such that rotation of said first and second inner gears provides a pumping action capable of pumping a flow of fluid through said fluid conduit.

5. The variable speed transmission assembly of claim 2 wherein said epicyclic gear mechanism comprises a pinion gear and at least one planet gear, said pinion gear rotatably fixed to said input member, said at least one planet gear disposed between said pinion gear and said ring gear in a manner such that said at least one planet gear is in meshing engagement with said pinion gear and said ring gear and such that rotation of said input member is capable of causing said at least one planet gear to revolve about an axis of rotation of said pinion gear at a revolution speed variably controllable by adjustment of said adjustable valve.

6. The variable speed transmission assembly of claim 5 wherein said gear train comprises first and second power transmitting gears in meshing engagement, said at least one planet gear rotatably mounted to said first power transmitting gear whereby said first power transmitting gear serves as a rotatable planet carrier, and wherein said second power transmitting gear is rotatably fixed to said output member.

7. A variable speed transaxle comprising:
    a housing for an internally disposed gear train and an internally disposed pump for pumping fluid along a fluid conduit;
    at least one axle shaft rotatably supported in said housing;
    an input shaft extending into said housing;
    said gear train including an epicyclic gear mechanism and drivingly connected between said input shaft and said at least one axle shaft; and
    said pump connected to said gear train and operable to vary the speed of rotation of said at least one axle shaft;
    wherein said epicyclic gear mechanism includes a first gear member, said first gear member disposed in a fluid engaging position in said fluid conduit.

8. The variable speed transaxle of claim 7 wherein said gear train comprises a differential, and said at least one axle shaft comprises two axle shafts connected to said differential.

9. The variable speed transaxle of claim 7 wherein said pump comprises a gerotor pump.

10. The variable speed transaxle of claim 9, wherein said first gear member comprises a ring gear, wherein said ring gear comprises a radial periphery with lobe-shaped teeth, and wherein said ring gear comprises an inner gerotor gear of said gerotor pump.

11. The variable speed transaxle of claim 7 wherein said pump comprises a gear pump.

12. The variable speed transaxle of claim 7 wherein said housing defines a sump for fluid transported through said fluid conduit.

13. The variable speed transaxle of claim 7 further comprising a second gear train and a second pump both internally disposed within said housing, said second gear train including an epicyclic gear mechanism and drivingly connected between said input shaft and said at least one axle shaft to rotate said at least one axle shaft in a second direction opposite to a direction the other gear train rotates said at least one axle shaft, said second pump connected to said second gear train and operable to vary the speed of rotation of said at least one axle shaft in said second direction.

14. The variable speed transaxle of claim 13 further comprising a counter shaft rotatably supported in said housing and drivingly connected to said at least one axle shaft, said counter shaft operatively connectable to each of said first and second gear trains, said counter shaft disposed parallel to said at least one axle shaft.

15. A reversible transmission comprising:
    a rotatable input member connectable to a drive source;
    an output member rotatable in forward and reverse directions;
    a housing;
    a first pump within said housing for pumping a fluid through a first fluid conduit;
    a second pump within said housing for pumping a fluid through a second fluid conduit;
    a first gear train operatively connected to said input member and said output member for transmitting rotational power of said input member to said output member to rotate said output member in said forward direction, said first gear train comprising an epicyclic gear mechanism coupled with said first pump and structured and arranged such that operation of said first pump controls a transmittal of rotational power to said output member through said first gear train, whereby a rotation of said output member in said forward direction is controllable; and
    a second gear train operatively connected to said input member and said output member for transmitting rotational power of said input member to said output member to rotate said output member in said reverse direction, said second gear train comprising an epicyclic gear mechanism coupled with said second pump and structured and arranged such that operation of said second pump controls a transmittal of rotational power to said output member through said second gear train, whereby a rotation of said output member in said reverse direction is controllable.

16. The reversible transmission of claim 15 wherein said first and second pumps comprise separate gerotor pumps.

17. The reversible transmission of claim 16 wherein said epicyclic gear mechanism of said second gear train comprises a ring gear, wherein said ring gear comprises a radial periphery with lobe-shaped teeth, and wherein said ring gear comprises an inner gerotor gear of said second pump.

18. The reversible transmission of claim 15 further comprising first and second adjustable valves, said first adjustable valve disposed along said first fluid conduit for varying a resistance to movement of fluid within said first fluid conduit to adjust an operational speed of said first pump, said second adjustable valve disposed along said second fluid conduit for varying a resistance to movement of fluid within said second fluid conduit to adjust an operational speed of said second pump, whereby speeds of rotation of said output member in said forward and rearward directions are controllable.

19. The reversible transmission of claim 18 wherein said first and second adjustable valves comprise different recessed portions of a common control rod.

20. A variable speed transaxle assembly comprising:

a rotatable input shaft for receiving rotary motion from an energy source;

a rotatable axle;

gear train means operatively connected to said rotatable input shaft for driving rotation of said rotatable axle, said gear train means comprising an epicyclic gear mechanism including at least one gear member capable of revolving around an axis at a variable speed; and pumping means connected to said epicyclic gear mechanism for controlling the revolutions of said at least one gear member to adjust a speed of rotation of said rotatable axle.

* * * * *